(12) United States Patent  
Baris et al.

(10) Patent No.: US 6,354,949 B1
(45) Date of Patent: Mar. 12, 2002

(54) MAINTENANCE FREE FLEXIBLE SHAFT DRIVE TRANSMISSION ASSEMBLY

(75) Inventors: Robert Baris, Cleveland; Matthew P. Dugan, Lakewood; Martin P. Tansey, Lorain, all of OH (US)

(73) Assignee: Bettcher Industries, inc., Birmingham, OH (US)

( * ) Notice: Subject to any disclaimer, the term of this patent is extended or adjusted under 35 U.S.C. 154(b) by 0 days.

(21) Appl. No.: 09/525,359

(22) Filed: Mar. 15, 2000

(51) Int. Cl.$^7$ .................................. F16C 1/24
(52) U.S. Cl. .............. 464/7; 464/53; 464/176
(58) Field of Search ................ 464/7, 51, 52, 464/53, 170, 173

(56) References Cited

U.S. PATENT DOCUMENTS

| | | | |
|---|---|---|---|
| 2,222,613 A | * 11/1940 | Green | 464/51 |
| 2,586,360 A | * 2/1952 | Mall | 464/51 |
| 2,918,808 A | * 12/1959 | Botti | 464/52 |
| 3,190,084 A | * 6/1965 | Moon et al. | 464/52 |
| 3,242,691 A | * 3/1966 | Robinson et al. | 464/53 |
| 3,340,703 A | * 9/1967 | Mincuzzi | 464/52 |
| 3,372,560 A | * 3/1968 | Dalton | 464/51 |
| 3,380,318 A | 4/1968 | Henning | |
| 3,393,534 A | 7/1968 | Hanebuth | |
| 3,435,634 A | 4/1969 | Chatham | |
| 3,518,844 A | 7/1970 | Robbins | |
| 3,587,248 A | * 6/1971 | Umanos | 464/52 |
| 3,785,752 A | 1/1974 | Crespo | |
| 3,922,882 A | 12/1975 | Kimata | |
| 4,112,708 A | 9/1978 | Fukuda | |
| 4,226,021 A | 10/1980 | Hoff | |
| 4,280,338 A | 7/1981 | Shannon et al. | |
| 4,451,983 A | 6/1984 | Johnson et al. | |
| 4,555,238 A | * 11/1985 | Miller et al. | 464/52 |
| 4,567,657 A | * 2/1986 | Krause | 464/52 |
| 4,944,711 A | * 7/1990 | Hironaka et al. | 464/52 |
| 4,964,839 A | * 10/1990 | Gloor | 464/52 |
| 4,989,323 A | * 2/1991 | Casper et al. | 464/52 |
| 5,035,055 A | 7/1991 | McCullough | |
| 5,161,427 A | 11/1992 | Fukuda et al. | |

* cited by examiner

*Primary Examiner*—Lynne H. Browne
*Assistant Examiner*—Kenn Thompson
(74) *Attorney, Agent, or Firm*—Watts Hoffmann Fisher & Heinke

(57) ABSTRACT

A flexible drive transmission comprising a flexible drive shaft assembly having a first end connectable to a drive motor and a second end connectable to a driven implement, a tubular casing surrounding and coaxial with the drive shaft assembly, a lubricant disposed within the casing, and a lubricant-seal for blocking leakage of lubricant from the second drive shaft assembly end. The drive shaft assembly comprises a flexible elongated drive transmitting member, a first drive coupling fixed to the drive transmitting member at a first end, and a second drive coupling fixed to the drive transmitting member at the second end. The casing rotatably supports the drive shaft assembly and comprises a tubular flexible conduit, and end fitting that permanently secures one drive coupling against axial movement relative to the casing. The lubricant seal is disposed between the second end fitting and the drive shaft assembly second end for blocking leakage of lubricant from the casing as the casing and drive shaft assembly rotate and shift axially relative to each other.

28 Claims, 3 Drawing Sheets

MAINTENANCE FREE FLEXIBLE SHAFT DRIVE TRANSMISSION ASSEMBLY

FIELD OF THE INVENTION

The present invention relates to flexible shaft drive transmissions and more particularly to flexible shaft drive transmissions that are used to transmit drive between relatively small motors and hand held tools or other driven implements that are moved relative to the drive motor during use.

BACKGROUND OF THE INVENTION

Flexible shaft drive transmissions serve to drive hand held tools, etc., from remote stationary motors so that the tool can be manipulated and moved around relative to the motor. Power operated rotary knives used in the meat packing industry are exemplary of such tools. These knives are often connected to overhead stationary motors via flexible drive transmissions so that workers using the knives are free to manipulate the knives while slicing meat being processed.

The flexible drive transmissions typically comprise a flexible drive shaft formed from a cable-like length of tightly wound wires, and a flexible casing that loosely surrounds the drive shaft. The drive shaft rotates within the casing, which is fixed against rotation, to transmit drive from the motor to the knife. As the knife is operated and the drive transmission is flexed, the drive shaft may contact the surrounding casing and also whip around within the casing, particularly when the knife requires relatively high torque and the drive transmission is relatively tightly curved. The casing contains a lubricant that reduces friction and shaft wear. The lubricant is edible so that, should it leak from the drive transmission, it does not contaminate the meat being processed. When the knife is operated without a proper supply of lubricant the drive shaft wears excessively and tends to whip around in the casing more than usual. Consequently the entire drive transmission vibrates. The worker using the knife can experience increasing discomfort as vibrations intensify over time.

In order to maximize the drive transmission life and reduce worker discomfort, drive transmission manufacturers have recommended frequent maintenance and drive shaft lubrication. The typical maintenance operation involves pulling the drive shaft out of the casing and wiping the lubricating grease off. A swab-like cleaning tool-such as a gun cleaning rod and swab-is then forced through the casing to scrub out residual lubricant and particulate material. Fresh lubricant is applied, and the drive shaft and casing are reassembled. Ideally this procedure is followed once or more per week depending on knife usage. But oftentimes proper maintenance procedures are practiced haphazardly, if at all.

There are various reasons why flexible drive transmissions are not properly maintained. In some facilities, where the knife operator must perform. maintenance, the time required for maintenance reduces productivity to an extent that is unacceptable to the operator. Moreover, the maintenance tasks themselves are not easily performed. Consequently, the average flexible drive transmission has a useful life of from 6 to 16 weeks depending, at least partly, on the frequency and thoroughness of the maintenance performed.

The present invention provides a new and improved flexible shaft drive transmission wherein the drive shaft is permanently fixed within the casing, the casing and drive shaft are sealed against leakage of lubricant from the transmission, and the need for periodic maintenance is obviated.

SUMMARY OF THE INVENTION

According to the invention a maintenance free flexible shaft drive transmission is provided that comprises a flexible drive shaft assembly having a first end connectable to a drive motor and a second end connectable to a driven implement, a tubular casing surrounding and coaxial with the drive shaft assembly, a lubricant disposed within the casing, and a lubricant seal for blocking leakage of lubricant from the second drive shaft assembly end.

The drive shaft assembly comprises a flexible elongated drive transmitting shaft member, a first drive coupling fixed to the drive transmitting shaft member at the first end, and a second drive coupling fixed to the drive transmitting shaft member at the second end.

The casing supports the drive shaft assembly for rotation generally about the longitudinal axis of the drive shaft assembly relative to the casing. The casing comprises a tubular flexible conduit loosely surrounding the drive transmitting shaft member, a first end fitting fixed to the conduit adjacent the first drive shaft assembly end and a second end fitting fixed to the conduit at the second drive shaft assembly end. The first end fitting comprises first and second fitting members that are fixed together and permanently secure the first drive coupling against axial movement relative to the casing to preclude removal of the drive shaft assembly from the casing. The first and second fitting members are constructed for enabling relative rotation between the drive coupling and the first end fitting;

The lubricant seal is disposed between the second end fitting and the drive shaft assembly second end for blocking leakage of lubricant from the casing as the casing and drive shaft assembly rotate and shift axially relative to each other.

Additional features and advantages will become apparent from the following description of an illustrated embodiment made with reference to the accompanying drawings which from part of the specification and wherein:

DESCRIPTION OF THE BEST KNOWN MODE FOR PRACTICING THE INVENTION

Figure 1:
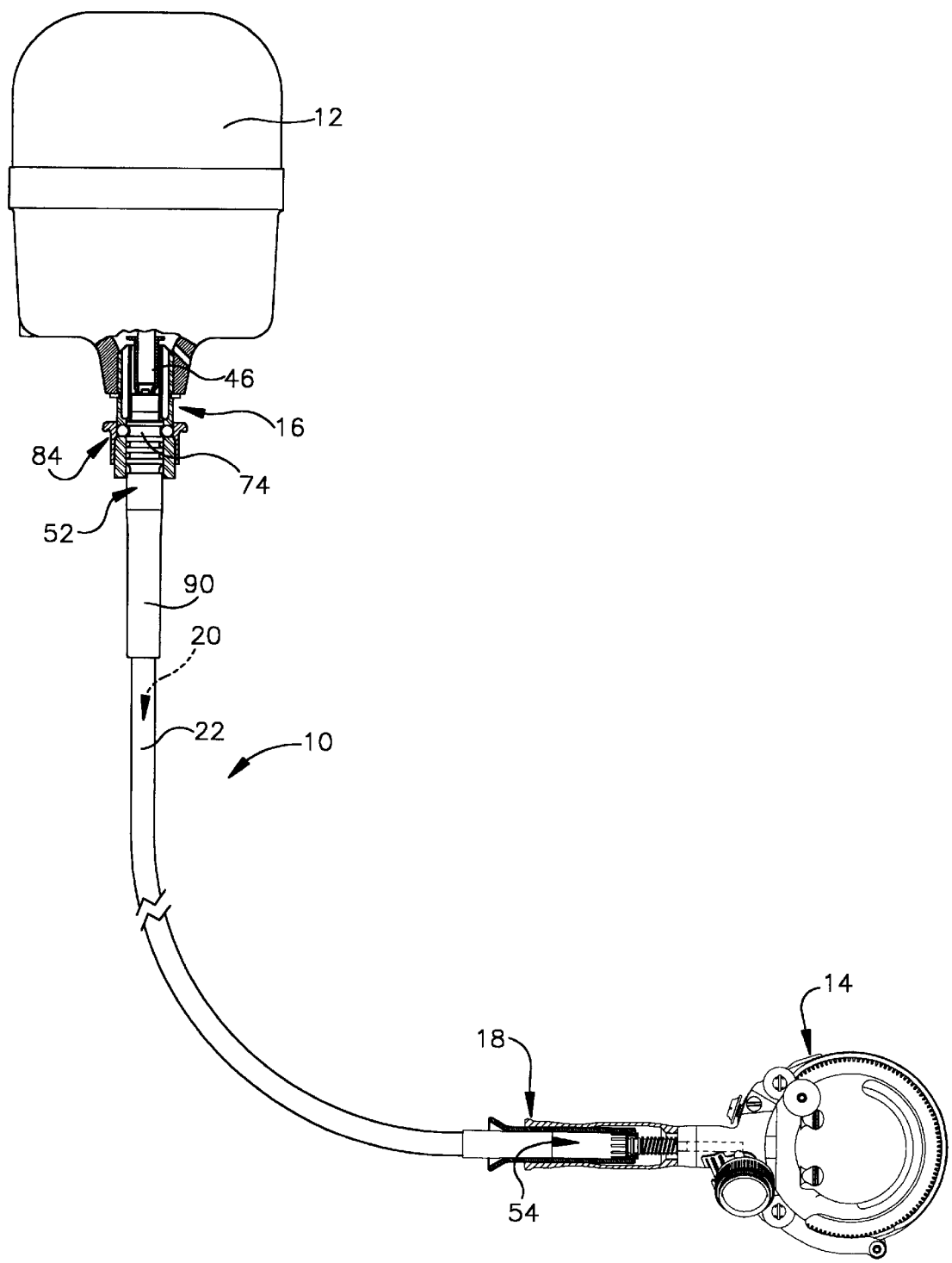
FIG. 1 is an elevational view of a flexible shaft drive transmission constructed according to the invention connected between a motor and a hand held power operated knife.

A flexible shaft drive transmission 10 constructed according to the invention is illustrated by the drawings. Referring to FIG. 1, the transmission 10 is illustrated as used for transmitting drive from a motor 12 to a power operated tool 14. The transmission 10 has a first end 16 connectable to the drive motor 12 and a second end 18 connectable to the tool 14. In the illustration of FIG. 1, the motor 12 is an electric motor that is suspended above a work station. The tool 14 is a rotary knife of the type that is used in the food processing industry for trimming cuts of meat. The knife is manually grasped and drawn across meat at the work station for trimming fat, removing meat from bones, etc. The knife 14 is illustrated as of a conventional, known type and therefore is not illustrated or described in detail. The knife 14 is shown for the purposes of illustration. Different knives and other tools may be used with the transmission 10.

Referring to FIG. 1, the illustrated flexible shaft drive transmission 10 comprises a flexible drive shaft assembly 20 connectable between the drive motor 12 and the tool 14, a tubular casing 22 surrounding and coaxial with the drive shaft assembly 20, and a relatively viscous lubricant, not illustrated, disposed within the casing. The casing 22 and drive shaft assembly 20 are sealed together for blocking leakage of lubricant from the casing as the casing and drive shaft assembly rotate and shift axially relative to each other. Where the transmission 10 is employed for operating a knife, or other food industry tool, the lubricant is edible. In the unlikely event lubricant leakage occurs, and lubricant reaches the food, there are no harmful consequences.

Figure 2:
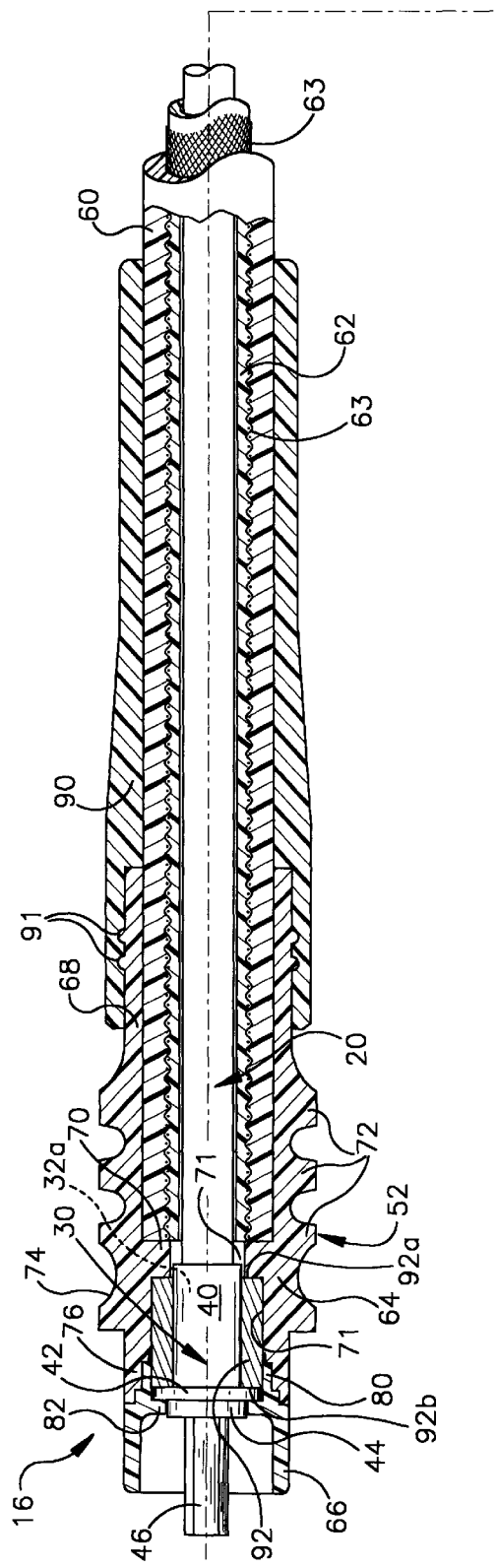
FIG. 2 is a fragmentary cross sectional view of the flexible shaft drive transmission shown in FIG. 1.
Figure 2:
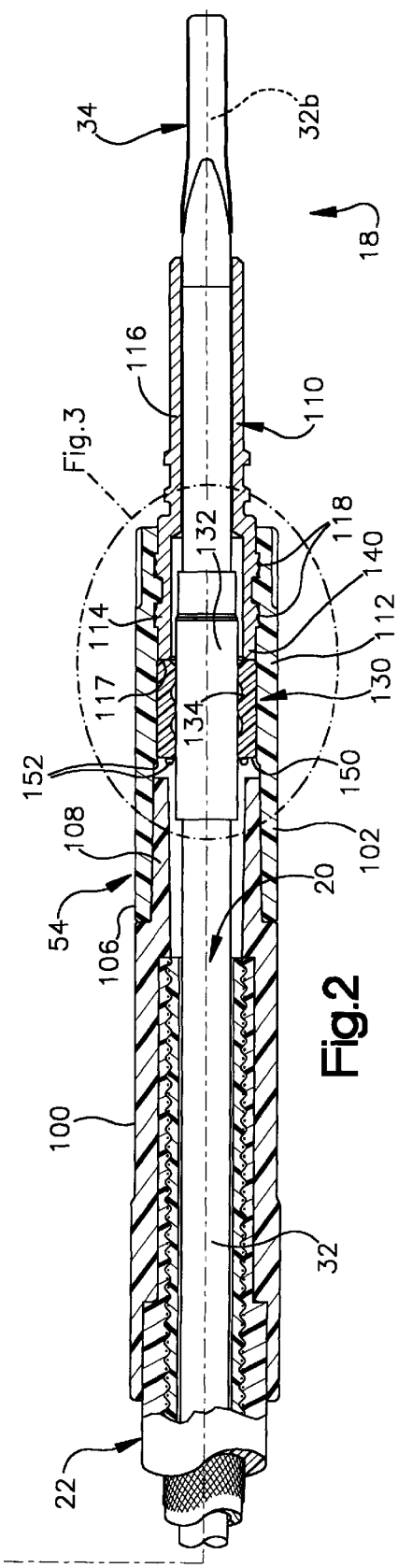

Referring to FIGS. 1 and 2, the drive shaft assembly 20 comprises a flexible elongated drive transmitting member 32, a first drive coupling 30 fixed to the drive transmitting member at the first end 16, and a second drive coupling 34 fixed to the drive transmitting member at the second end 18. The illustrated drive transmitting member 32 is a shaft composed of wires that are tightly wound into a helix that is capable of transmitting substantial torque yet is flexible so that the knife 14 can be manipulated while drive is transmitted to it. The member, or shaft, 32 may be of any suitable or conventional construction and therefore is not described further.

The drive coupling 30 is rotatable with the shaft 32 and fixed against movement axially relative to the casing 22. The illustrated coupling 30 is formed by a ferrule-like member having a sleeve body 40 fixed to the shaft 32, a radial flange 42 that is fixed against axial movement relative to the casing, an abutment shoulder 44 projecting from the flange 42, and a driving projection 46 that extends into driving engagement with a suitable receptacle on the output shaft of the motor 12 when the transmission 10 is connected to the motor.

The coupling 30 is fixed to the shaft 32 for positively transmitting drive from the motor to the shaft 32. In the illustrated embodiment, the shaft tip end 32a is swaged to form an essentially solid cylinder and the hollow sleeve body 40 is assembled onto it. The sleeve body fits snugly on the swaged tip end and is secured in place by an adhesive bonding material and a further swaging operation. The bonding material is applied to the sleeve body interior and to the tip end. The sleeve body is then swaged onto the tip end, reducing the sleeve body diameter and causing the sleeve body 40 to tightly hug the tip end.

The second drive coupling 34 transmits drive to the knife 14 from the shaft 32 at the tip end 32b. The coupling 34 is so constructed and arranged that it provides an essentially solid square cross-section shaped shaft end 32b having a substantially continuous outer surface that eliminates the possibility of shaft wires unraveling at the tip end 32b. The drive coupling 34 comprises the drive transmitting shaft end 32b and a thin sleeve 48 that is fixed to the drive transmitting shaft member end 32b. The sleeve 48 has a first end 48a distal the tip end 32b and second end 48b that is coterminus with the drive transmitting shaft member end 32b. The sleeve and shaft member end are compressed together to form a unitary drive coupling having a circular cross sectional shape at the first sleeve end. The drive coupling transitions to a square-cross sectional shape proceeding toward said second sleeve end.

In the illustrated drive transmission, the shaft tip end 32b is initially swaged into a round cross-section (not illustrated) and cut-off to the desired length. In this stage of production, the shaft wires are yieldably deformed but do not form a substantially solid cylindrical shaft section. The swaged portion of the shaft 32 extends a short distance from the shaft tip, e.g. approximately 3 cm. The illustrated coupling 34 is formed in part by a thin steel sleeve that is both bonded and swaged onto the shaft tip end 32b. The coupling sleeve 48 is initially an open ended cylinder that is sized to fit snugly on the swaged tip end. Bonding material is applied to the swaged tip end and the coupling sleeve is assembled onto it. The sleeve 48 and tip end 32b are then subjected to another swaging operation that shapes both into an elongated tip end that has a square cross sectional shape at its distal end. The shaft wires and sleeve are compressed into a substantially solid mass extending through the square cross sectional shaped end with said sleeve forming a substantially continuous outer surface.

In the illustrated embodiment of the invention the shaft tip end and sleeve 48 transition from a circular cross sectional shape at the proximal sleeve end to the square cross section distal end. The swaging tool is constructed so that the proximal end of the sleeve 48 and the underlying shaft are swaged to reduce their diameters slightly with the underlying wires being resiliently deformed and reacting against the sleeve interior to locally grip the sleeve. The underlying wires are compacted further proceeding toward the shaft tip end. The sleeve completely covers the tip end 32b where it is received by a drive socket in the knife 14 so that it is not possible for frayed wire fragments to interfere with the connection between the knife and transmission 10. It should be appreciated that the drive coupling 34 can be applied equally well to the disclosed drive transmission 10 or any flexible drive shaft that is constructed like the shaft 32.

The casing 22 supports the drive shaft assembly 20 for rotation relative to the casing generally about the drive shaft assembly longitudinal axis. The casing 22 comprises a tubular flexible conduit 50 loosely surrounding the drive transmitting shaft 32, a first end fitting 52 fixed to the conduit at the end 16 for connecting the end 16 to the motor 12, and a second end fitting 54 fixed to the conduit at the second end 18 for connecting the end to the knife 14. The shaft 32 is freely rotatable with respect to the conduit 50 and fittings 52, 54, while being permanently secured within the casing.

The conduit 50 is formed by a molded flexible tubular outer body 60, an inner sheath 62 that loosely surrounds the shaft 32 and a stainless steel braid 63 that is interposed between the outer body and sheath. The illustrated conduit is constructed by braiding stainless steel wires tightly around the sheath 62 and then molding the outer body over the braid and sheath. The outer body 60 is formed by a plastic material that flows through the braiding and adheres to the sheath. Because of adhesion between the sheath and outer body, and mechanical interconnections between the braid, sheath and body, the conduit elements are bound together and function as a single unit. The body 60 may be formed from PVC, for example, while the sheath is formed from nylon or polyester. The body 60 may be of any suitable or conventional construction and therefore is not described in further detail. The conduit is produced in significant length and stored in coil form. When fabricating a transmission 10, the conduit is cut to length and its ends are machined appropriately for receiving the end fittings 52, 54.

The end fitting 52 comprises first and second fitting members 64, 66, respectively, that are fixed together to permanently secure the first drive coupling 30 against axial movement relative to the casing 22 and preclude removal of the-drive shaft assembly 20 from the casing 22. The fitting member 64 is anchored to the conduit 50 and thus fixed against movement relative to the casing. In the illustrated embodiment the member 64 is formed from nylon and is injection molded onto the conduit end but the member 64 may be formed from any over-moldable, relatively rigid resin. The fitting member 64 comprises a sleeve-like body section 68 that extends along the conduit exterior., The interior of the body section defines a radially inwardly extending flange 70 that overlies the conduit end and forms an annular space 71 about the sleeve body 40. The exterior of the member 64 forms a series of gripping ridges 72 and a detent ball receiving groove 74 that coacts with a flex shaft connecting detent mechanism attached to the motor 12 (see FIG. 1). The member 64 terminates in a hollow cylindrical end section 76 that defines a stepped inner surface and projects toward the motor 12.

The second end fitting member 66 captures the coupling member 30 within the casing and forms a socket-like receptacle surrounding the driving projection 46. The member 66 defines an axially extending sleeve section 80 secured to the fitting member 64 and a radially inwardly extending flange 82 that confronts the coupling member flange 42. The sleeve section 80 has a stepped outer surface that projects into, and conforms with, the end section 76. In the illustrated embodiment, the fitting members 64, 66 are fixed together by spin welding. The fitting members are assembled together with the sleeve section 80 projecting into contact with the end section 76. The members are relatively rotated under pressure until they fuse together at their juncture. The resulting connection between them is permanent in that they are only separable by destroying the end fitting 52.

When the end fitting members 64, 66 are fixed together, the fitting member flange 82 extends along the axially outer face of the coupling flange 42 and prevents the coupling 30 from moving out of the end of the casing 22. The abutment shoulder 44 extends axially through the inner diameter of the fitting member flange 82 and serves to engage rotating parts of the motor 12 that might otherwise abrade the non-rotating fitting member flange 82 when the knife is operating.

In the illustrated embodiment of the invention, a stress relief sleeve 90 surrounds the conduit 50 at the motor end 16 so that excessive flex shaft bending immediately adjacent the motor is avoided. The sleeve 90 is molded over the fitting member 64 and the conduit 50. The fitting member 64 is illustrated as provided with external annular ridges 91 that assist in securing the sleeve 90 in place. The illustrated sleeve 90 is formed from a thermoplastic olefin material, but it could be of any suitable flexible resin.

In the illustrated embodiment of the invention the transmission end 16 is sealed against loss of lubricant from, and against the ingress of contaminants into, the casing. As illustrated, a seal is formed between the coupling 30 and the end fitting 52. The end fitting 52 supports a bearing 92 that engages and supports the outer cylindrical surface of the sleeve body 40. The illustrated bearing 92 is formed by a generally cylindrical bronze sleeve having axial ends that form seal faces. The outer cylindrical surface of the illustrated bearing defines eight axially extending ribs that are equi-angularly spaced about the bearing periphery with each rib projecting radially outwardly a short distance. The bearing is received in the annular space 71 in the fitting member 64.

The bearing 92 is pressed into the fitting member 64 after the fitting member has been molded onto the casing end. The inner surface of the space 71 is provided with axially extending ribs, not shown, that project radially inwardly and are partially crushed as the bearing is pressed into the member 64. Each outer rib on the bearing extends between adjacent fitting member ribs on the inner surface of the space 71. Should the bearing 92 tend to turn in the fitting member 64 during use, ribs on the respective bearing and fitting member engage and prevent further motion.

The bearing is forced into the member 64 until the bearing end face 92a firmly abuts, and seals against, the flange 70. The outer surface of the sleeve member 40 is smooth and cylindrical and conforms to the smooth, cylindrical inner surface of the bearing member 92 so that a running fit exists between the surfaces. In the illustrated embodiment of the invention the coupling member flange 42 is biased to engage and seal against the axial end face 92b of the bearing 92. The bearing end faces 92a, 92b are illustrated as flat, smooth and annular. In the illustrated transmission, when the end 16 is attached to the motor, the flange 42 is biased against the bearing end face 92b at least partly by gravity. The surface to surface engagement between the bearing member 92 and both the coupling member 30 and the fitting member 64 provides a labyrinthine sealing path and blocks fluid leakage into and out of the casing at the transmission end 16.

When the knife 14 is to be operated, the operator grasps the end fitting 52 and inserts the end 16 into a receiving opening in the motor housing. The receiving opening is illustrated as surrounded by a quick-release type detent mechanism 84 that is schematically shown in FIG. 1. The end 16 is thrust into the motor housing opening and the detent mechanism is operated to lock the end in place by forcing detent balls into the groove 74. The driving projection 46 moves into torque transmitting relationship with a drive adapter fixed to the motor output shaft so that when the motor is turned on the drive shaft 32 is driven. The detent mechanism is manually operated to release the transmission end 16. The illustrated detent mechanism may be of any conventional or suitable construction.

The end fitting 54 is disposed at the transmission end 18 and comprises end fitting members 100, 102 (See FIG. 2). The fitting member 100 is overmolded onto the conduit end portion and is illustrated as formed by a tubular, generally cylindrical body that surrounds the end of the conduit and defines a shoulder 106 and reduced diameter projecting portion 108 distal the conduit end.

The end fitting member 102 is a composite member formed by a tubular shaft guide part 110 and a cylindrical plastic body 112 that is molded onto the guide part 110. The guide part 110 defines a cylindrical base section 114 that is disposed within the body 112 and a cylindrical shaft embracing section 116 that projects away from the body 112. The base section 114 has a smooth planar annular end face 117 and its external surface carries annular ribs 118 that permanently interlock the parts 110, 112. The shaft embracing section 116 is constructed and arranged so that it is detachably connectable to the tool being driven. In the illustrated embodiment, the section 116 is sized so that its internal diameter closely surrounds the shaft 32 and its external diameter fits within the knife 14. The illustrated section 116 carries annular ribs that assist in maintaining the transmission attached to the knife 14. The connection between the knife 14 and the transmission 10 may be of any suitable or conventional construction and therefore is not illustrated or described in detail.

The end fitting body 112 is molded onto the guide part 110, as noted, and is generally cylindrical with an inner periphery that extends from the radially outer diameter of the end face 117 to the shoulder 106. The inner surface of the body 112 and the outer surface of the fitting member 100 are both stepped to conform to each other so that when the fitting members 100, 102 are assembled, the body 112 telescopes over the outer surface of the fitting member 100.

The fitting members 100, 102 are permanently fixed together. In the illustrated embodiment the fitting members are spin welded together to permanently join them. This is accomplished by telescoping the members 100, 102 together and spinning the member 102 relative to the member 100 under pressure so that the body 112 fuses with the member 100.

Figure 3:
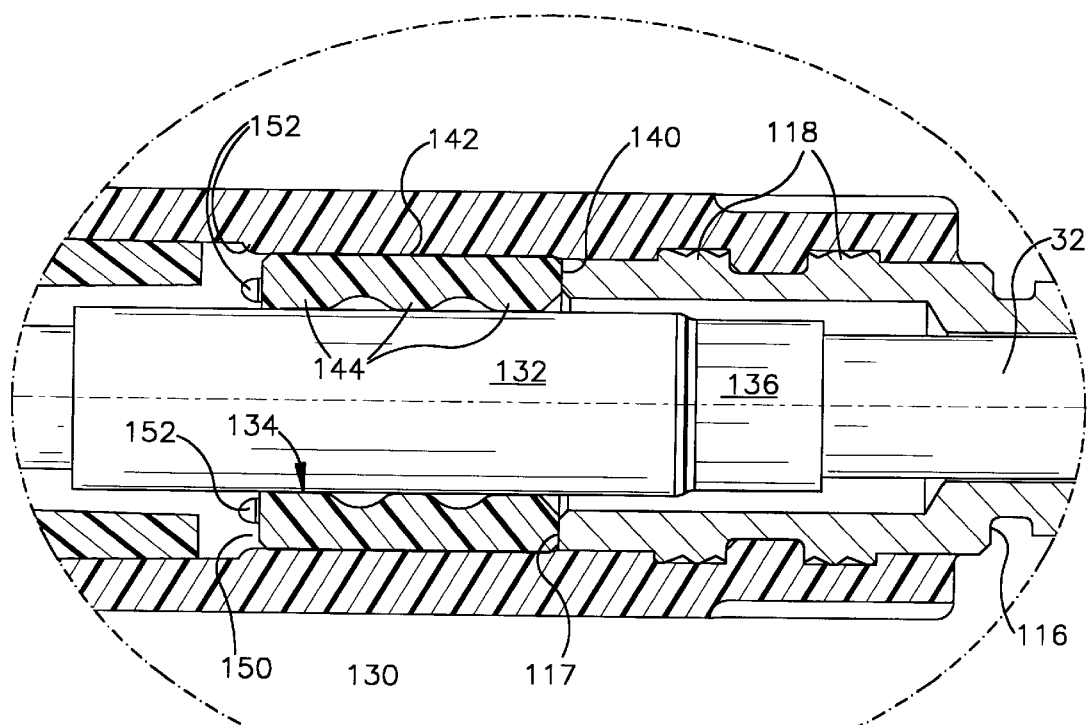
FIG. 3 is a view of part of the transmission of FIG. 2 seen within the broken line designated FIG. 3 of FIG. 2, shown enlarged; and, FIG. 4 is a view similar to FIG. 3 illustrating an alternative construction.

The transmission end 18 is sealed against loss of lubricant from, and against the ingress of contaminants into, the casing. As illustrated in FIGS. 2 and 3, a lubricant seal 130 is disposed between the casing 22 and the shaft 32. The lubricant seal 130 blocks leakage of lubricant from the casing 22 as the casing and drive shaft assembly rotate and shift axially relative to each other. The seal 130 comprises a first sealing member 132 fixed with respect to the shaft 32 and a second sealing member 134 sealingly engaged with the first sealing member and fixed with respect to the casing.

In the illustrated embodiment of the invention the sealing member 132 is formed by a smooth metal sleeve that is fixed on the shaft 32. The sleeve 132 extends axially along the shaft 32 over a distance that is greater than the axial extent of the sealing member 134. As illustrated, the sleeve member 132 has an internal diameter that is slightly larger than the flex shaft diameter except at one end 136 where the sleeve member is swaged, or crimped, into tight engagement with the shaft. The member 132 is firmly fixed against axial movement along the shaft as well as being fixed against rotation relative to the shaft. In the illustrated construction a bonding material is applied to the shaft before the swaging operation so that the sealing member is both bonded and mechanically crimped to the shaft at the contact location. The bonding material also serves to assist in sealing the juncture of the shaft and the sealing member end portion 136. The unswaged remainder of the sealing member 132 projects along the shaft in sealing engagement with the sealing member 134.

In the illustrated transmission 10 the sealing member 134 seals against the sealing member 132 to block leakage along the shaft member 32 as well as sealing against leakage between the member 134 and the fitting member 110. The sealing member 134 is formed by a generally cylindrical sleeve-like body defining a smooth planar end face 140, a cylindrical outer face 142 and an inner face defining a series of axially spaced resilient, annular ribs 144 that project radially inwardly into sealing relationship with the member 132.

In the illustrated drive transmission, the casing 22 and flex shaft assembly 20 are axially secured together at the end 16 by virtue of the flange 42 being permanently fixed between the bearing 92 and the flange 82. When the knife is operated and the transmission 10 is flexed and moved about, relative axial movement occurs between the flex shaft assembly and the casing 22 at the end 18 remote from the end 16. The seal member 134 is constructed so that it may shift axially relative to the seal member 132 without adversely affecting the sealing relationship between the members 132, 134. In the illustrated construction the seal member 132 extends axially beyond the seal member 134 so that the ribs 144 all remain sealingly engaged with the member 132 throughout the range of axial relative movement.

In the embodiment illustrated by FIG. 3, the seal member 134 is formed from a suitable plastic material and is fixed in the fitting member 102 before the fitting members 100, 102 are spin welded together. The interior of the member 112 adjacent the shaft embracing member 110 is a generally cylindrical space 150 having axially extending ribs 152 molded in its internal periphery. The ribs 152 extend away from the annular end face 117 on the member 110 towards the open end of the member 112. The seal member 134 is pressed into the member 112 so that the end face 140 and the face 117 are in tight sealing contact. The cylindrical outer seal member face 142 forms an interference fit with the longitudinal ribs 152 so that the seal member is tightly secured in place within the member 112 and the sealing relationship between the faces 117, 140 is maintained.

Figure 4:
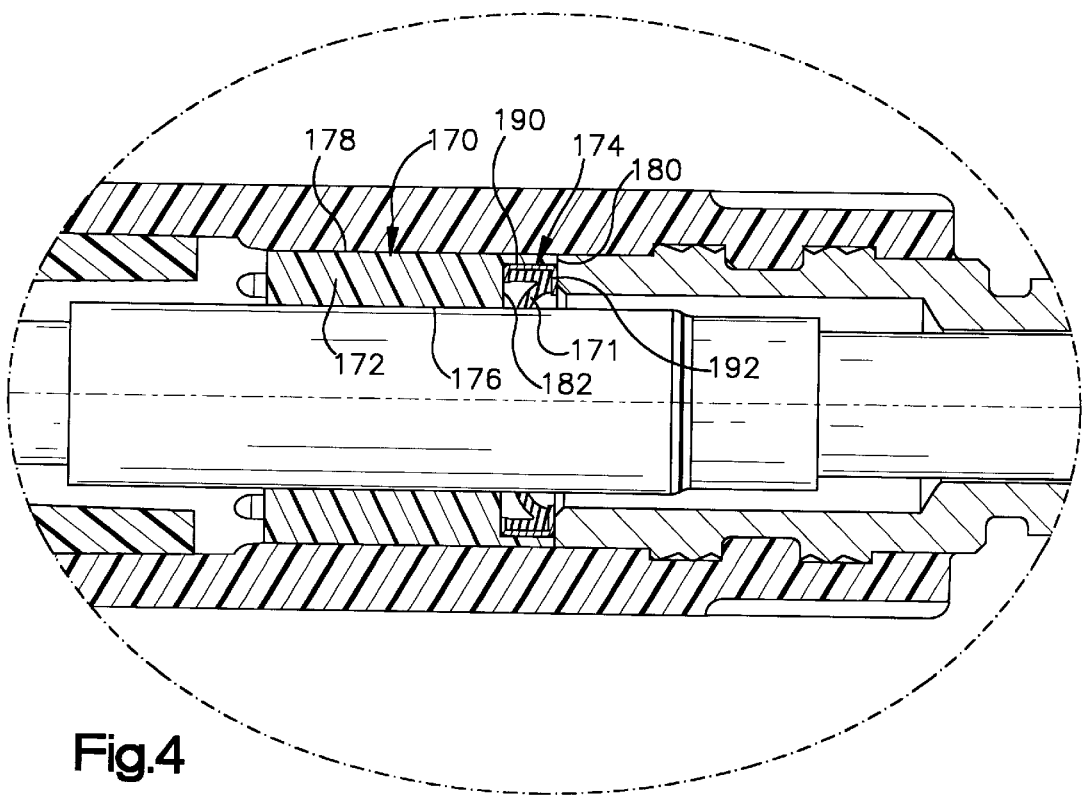

FIG. 4 illustrates an alternative embodiment. The embodiment of FIG. 4 is the same as that of FIGS. 1–3 except that the seal member 134 is replaced by a modified seal member 170. The seal member 170 seals against the sealing member 132 to block leakage along the shaft member 32 as well as sealing against leakage between the member 170 and the fitting member 110. The seal 170 comprises a resilient annular rib-like element 171 surrounding the drive transmission member and projecting into sealing contact with the surface of the sealing member 132. The illustrated seal member 170 is an assembly formed by a generally annular member 172 and a seal unit 174 sealed to and carried by the member 172. The member 172 is elongated and defines cylindrical interior and exterior surfaces 176, 178 respectively, an annular, flat smooth end face 180, and a rectilinear notch 182 formed in the end face 180 and interior surface 176.

The seal unit 174 is illustrated as a cartridge type seal having an annular body 190 that carries the annular resilient rib-like element 171. The illustrated body 190 is a sheet metal annulus having an "L" shaped cross section with a radially extending end face 192. The element 171 is bonded to the body 190 and projects radially into sealing engagement with the member 132. The seal unit is pressed into the notch 182. If desired, a bonding material may be introduced into the notch 182 before the seal is pressed into place so that the bonding material both seals and adheres the seal unit to the member 172.

The assembled seal member 170 is pressed into the assembled fitting members 110, 112, as described above, with the seal unit end face 192 and the end face 180 sealingly engaging the fitting member face 117.

While two embodiments of the invention have been illustrated and described in considerable detail the invention is not to be considered limited to the precise constructions disclosed. Various adaptations, modifications and uses of the invention may occur to those skilled in the art to which the invention relates. The intention is to cover hereby all such adaptations, modifications and uses that fall within the spirit or scope of the appended claims.

Having described our invention we claim:

1. A maintenance free flexible shaft drive transmission having a first end connectable to a drive motor and a second end connectable to a driven implement, said transmission comprising:

a. a flexible drive shaft assembly comprising a flexible elongated drive transmitting member, and a drive coupling fixed to said drive transmitting member at said first end;

b. a tubular casing surrounding and coaxial with said drive shaft assembly and supporting said drive shaft assembly for rotation generally about the longitudinal axis of said drive shaft assembly relative to said casing, said casing comprising a tubular flexible conduit loosely surrounding said drive transmitting member, a first end fitting fixed to said conduit adjacent said first end and a second end fitting fixed to said conduit at said second end;

c. said first end fitting comprising first and second fitting members that are fixed together and permanently secure said drive coupling against axial movement relative to said casing to preclude removal of said drive shaft assembly from said casing, said first and second fitting members constructed for enabling relative rotation between said drive coupling and said first end fitting; and, d. a lubricant disposed within said casing;

e. said casing and said drive shaft assembly sealed together for blocking leakage of lubricant from said casing as said casing and drive shaft assembly rotate and shift axially relative to each other;

f. said drive coupling comprising an elongated body fixed to said drive transmitting member and projecting axially from said first end fitting, a radially outwardly extending flange formed on said drive coupling body, one of said fitting members confronting said flange along one axial side thereof for axially retaining said drive coupling body flange within said end fitting.

2. The flexible shaft drive transmission claimed in claim 1 wherein said first drive-coupling comprises a cylindrical face coaxial with said drive transmission member, and further comprising a bearing member surrounding and engaging said cylindrical face, said bearing member defining sealing faces that engage said drive transmission member and said casing to block passage of lubricant from said first end.

3. The flexible shaft drive transmission claimed in claim 1 further comprising a lubricant seal at said second end between said casing and said drive shaft assembly, said seal comprising a sleeve member defining a sealing surface, said sleeve member fixed to said drive transmission member.

4. A maintenance free flexible shaft drive transmission having a first end connectable to a drive motor and a second end connectable to a driven implement, said transmission comprising:

a. a flexible drive shaft assembly comprising a flexible elongated drive transmitting member, a drive coupling fixed to said drive transmitting member at said first end;

b. a tubular casing surrounding and coaxial with said drive shaft assembly and supporting said drive shaft assembly for rotation generally about the longitudinal axis of said drive shaft assembly relative to said casing, said casing comprising a tubular flexible conduit loosely surrounding said drive transmitting member, a first end fitting fixed to said conduit adjacent said first end and a second end fitting fixed to said conduit at said second end;

c. said first end fitting comprising first and second fitting members that are fixed together and permanently secure said drive coupling against axial movement relative to said casing to preclude removal of said drive shaft assembly from said casing, said first and second fitting members constructed for enabling relative rotation between said drive coupling and said first end fitting;

d. a lubricant disposed within said casing;

e. said casing and said drive shaft assembly sealed together for blocking leakage of lubricant from said casing as said casing and drive shaft assembly rotate and shift axially relative to each other, the sealed relationship between said casing and drive shaft comprising a lubricant seal at said second end between said casing and said drive shaft assembly, said seal comprising a sleeve member defining a sealing surface, said sleeve member fixed to said drive transmitting member.

5. The flexible shaft drive transmission claimed in claim 4 wherein said seal member comprises a plurality of said annular rib-like elements contacting said surface at locations spaced axially apart along said sealing surface.

6. The flexible shaft drive transmission claimed in claim 1 wherein said first fitting member of said first end fitting is molded in place on said conduit and said second fitting member of said first end fitting is bonded to said first fitting member.

7. A maintenance free flexible shaft drive transmission having a first end connectable to a drive motor and a second end connectable to a driven implement, said transmission comprising:

a. a flexible drive shaft assembly comprising a flexible elongated drive transmitting member, a drive coupling fixed to said drive transmitting member at said first end, and a second drive coupling fixed to said drive transmitting member at said second end;

b. a tubular casing surrounding and coaxial with said drive shaft assembly and supporting said drive shaft assembly for rotation generally about the longitudinal axis of said drive shaft assembly relative to said casing, said casing comprising a tubular flexible conduit loosely surrounding said drive transmitting member, a first end fitting fixed to said conduit adjacent said first end and a second end fitting fixed to said conduit at said second end;

c. said first end fitting comprising first and second fitting members that are fixed together and permanently secure said drive coupling against axial movement relative to said casing to preclude removal of said drive shaft assembly from said casing, said first and second fitting members constructed for enabling relative rotation between said drive coupling and said first end fitting; and, d. a lubricant disposed within said casing;

e. said casing and said drive shaft assembly sealed together for blocking leakage of lubricant from said casing as said casing and drive shaft assembly rotate and shift axially relative to each other f. said first fitting member of said first end fitting molded in place on said conduit and said second fitting member of said first end fitting bonded to said first fitting member.

8. The flexible shaft drive transmission claimed in claim 1 wherein said drive coupling comprises a radially outwardly extending flange disposed between said first and second fitting members of said first end fitting, said first fitting member confronting a first axial face of said flange, said first end fitting further comprising a bearing disposed between said flange and said second fitting member, said bearing engaging a second axial flange face so that said flange is secured between said first fitting member and said bearing.

9. A maintenance free flexible shaft drive transmission comprising:

a. a flexible drive shaft assembly having a first end connectable to a drive motor and a second end connectable to a driven implement, said drive shaft assembly comprising a flexible elongated drive transmitting member, a first drive coupling fixed to said drive transmitting member at said first end, and a second drive coupling fixed to said drive transmitting member at said second end;

b. a tubular casing surrounding and coaxial with said drive shaft assembly, said casing supporting said drive shaft assembly for rotation generally about the longitudinal axis of said shaft assembly relative to said casing, said casing and drive shaft assembly secured together so that said drive shaft assembly can not be removed from said casing, said casing comprising a tubular flexible conduit loosely surrounding said drive transmitting member, a first end fitting fixed to said conduit adjacent said first drive shaft assembly end and a second end fitting fixed to said conduit at said second drive shaft assembly end;

c. a lubricant disposed within said casing; and, d. a lubricant seal between said second end fitting and said drive shaft assembly second end, said seal comprising a smooth axially extending cylindrical sealing surface carried by one of said drive shaft assembly or said second end fitting and a sealing member carried on the other of said drive shaft assembly or said second end fitting, said sealing member projecting into sealing engagement with said sealing surface and maintaining a sealing relationship with said surface as said surface and sealing member rotate relative to each other and shift axially relative to each other.

10. The maintenance free flexible shaft drive transmission claimed in claim 9 wherein said second end fitting comprises first and second fitting members that are fixed together and permanently secure said sealing member therebetween against axial movement relative to said casing.

11. The maintenance free flexible shaft drive transmission claimed in claim 10 wherein said sealing surface is defined by a tubular member having an axial end region secured to said drive transmission member and a body region projecting along said drive transmission member from said end region.

12. The maintenance free flexible shaft drive transmission claimed in claim 11 wherein said seal member comprises an elastomeric body defining a plurality of sealing ribs spaced axially apart and sealingly engaging said body region.

13. The maintenance free flexible shaft drive transmission claimed in claim 10 wherein said first and second fitting members are welded together.

14. The maintenance free flexible shaft drive transmission claimed in claim 9 wherein said second drive coupling comprises a thin cylindrical sleeve that is swaged onto the drive transmitting member tip end, said drive transmitting member comprising an elongated flex shaft having a generally circular cross sectional shape and comprised of hectically wound wires, said sleeve and tip end compressed together to form a unitary drive coupling having a circular cross sectional shape at the sleeve end that is spaced from the tip end and transitioning to a square cross sectional shape proceeding toward the tip end.

15. A maintenance free flexible shaft drive transmission comprising:

a. a flexible drive shaft assembly having a first end connectable to a drive motor and a second end connectable to a driven implement, said drive shaft assembly comprising a flexible elongated drive transmitting member, a first drive coupling fixed to said drive transmitting member at said first end, and a second drive coupling fixed to said drive transmitting member at said second end;

b. a tubular casing surrounding and coaxial with said drive shaft assembly, said casing supporting said drive shaft assembly for rotation generally about the longitudinal shaft assembly axis relative to said casing, said casing comprising a flexible conduit extending about said drive transmitting member, a first end fitting fixed to said conduit adjacent said first drive shaft assembly end, and a second end fitting fixed to said conduit at said second drive shaft assembly end; and, c. a lubricant disposed within said casing;

d. said first end fitting comprising first and second fitting members fixedly secured to each other, and a bearing member supported by one of said first and second fitting members, said drive coupling comprising a radially extending portion clamped between the other of said first and second fitting members and said bearing member and an axially extending portion surrounded by said bearing member, said drive coupling portions, bearing member and first and second fitting members forming a labyrinth seal for impeding leakage of lubricant from said drive transmission.

16. The maintenance free flexible shaft drive transmission claimed in claim 15 wherein said first and second fitting members are bonded together.

17. The maintenance free flexible shaft drive transmission claimed in claim 15 wherein drive coupling has projecting shoulder that extends axially through said other fitting member for engaging rotating parts of a drive motor that might otherwise abrade said other fitting member.

18. The maintenance free flexible shaft drive transmission claimed in claim 15 further comprising a lubricant seal between said second end fitting and said drive shaft assembly second end, said seal comprising a sealing surface carried by one of said drive shaft assembly or said second end fitting and a sealing member carried on the other of said drive shaft assembly or said second end fitting, said sealing member engaging said sealing surface and maintaining a sealing relationship with said surface as said surface and sealing member rotate relative to each other and said drive shaft assembly and second end fitting shift axially relative to each other.

19. In a flexible drive shaft assembly having an end connectable to a driven implement, said drive shaft assembly comprising:

a. an elongated drive transmitting shaft member having a generally circular cross sectional shape and comprised of helically wound wires, and a drive coupling at said end for transmitting drive to a driven implement;

b. said drive coupling comprising a thin sleeve that is fixed to the drive transmitting shaft member at said end, said sleeve having a first end distal the tip end of said drive transmitting shaft member and second end coterminus with the drive transmitting shaft member end, said sleeve and shaft member end compressed together to form a unitary drive coupling having a circular cross sectional shape at said first sleeve end, said drive coupling transitioning to a square cross sectional shape proceeding toward said second sleeve end, said wires and sleeve compressed into a substantially solid mass in said square cross sectional shaped end with said sleeve forming a substantially continuous outer surface.

20. The flexible drive shaft claimed in claim 19 wherein said sleeve and shaft member are bonded together.

21. The flexible drive shaft claimed in claim 19 wherein said sleeve and shaft member are resiliently engaged at said first sleeve end.

22. A method of making an end coupling for a flexible drive shaft comprising the steps of:

a. providing a drive transmitting shaft member having a generally circular cross sectional shape and comprised of helically wound wires;
b. telescoping a thin sleeve onto a tip end of the shaft member;
c. swaging the shaft end and sleeve into a round cross-section remote from the tip end;
d. swaging the shaft end and sleeve to form a square cross sectional shape at the tip end;
e. swaging the shaft end comprising compressing said shaft wires and sleeve into a substantially solid mass extending through said square cross sectional shaped end.

23. The method claimed in claim 22 further including placing bonding material between said shaft member and said sleeve before swaging the shaft end and sleeve.

24. A maintenance free flexible shaft drive transmission having a first end connectable to a drive motor and a second end connectable to a driven implement, said transmission comprising:
a. a flexible drive shaft assembly comprising a flexible elongated drive transmitting member, and a drive coupling fixed to said drive transmitting member at said first end;
b. a tubular casing surrounding and coaxial with said drive shaft assembly and supporting said drive shaft assembly for rotation generally about the longitudinal axis of said drive shaft assembly relative to said casing, said casing comprising a tubular flexible conduit loosely surrounding said drive transmitting member, a first end fitting fixed to said conduit adjacent said first end and a second end fitting fixed to said conduit at said second end;
c. said first end fitting comprising first and second fitting members that are fixed together and permanently secure said drive coupling against axial movement relative to said casing to preclude removal of said drive shaft assembly from said casing, said first and second fitting members constructed for enabling relative rotation between said drive coupling and said first end fitting; and,
d. a lubricant disposed within said casing;
e. said casing and said drive shaft assembly sealed together for blocking leakage of lubricant from said casing as said casing and drive shaft assembly rotate and shift axially relative to each other;
f. said drive coupling comprising a cylindrical face coaxial with said drive transmission member, and further comprising a bearing member surrounding and engaging said cylindrical face, said bearing member defining sealing faces that engage said drive transmission member and said casing to block passage of lubricant from said first end.

25. The flexible shaft drive transmission claimed in claim 4 wherein said lubricant seal further comprises a seal member fixed with respect to said second end fitting and comprising a resilient annular rib-like element surrounding said drive transmitting member and projecting into contact with said sealing surface.

26. The flexible shaft drive transmission claimed in claim 7 wherein said first and second fitting members are welded together.

27. A maintenance free flexible shaft drive transmission having a first end connectable to a drive motor and a second end connectable to a driven implement, said transmission comprising:
a. a flexible drive shaft assembly comprising a flexible elongated drive transmitting member, a drive coupling fixed to said drive transmitting member at said first end;
b. a tubular casing surrounding and coaxial with said drive shaft assembly and supporting said drive shaft assembly for rotation generally about the longitudinal axis of said drive shaft assembly relative to said casing, said casing comprising a tubular flexible conduit loosely surrounding said drive transmitting member, a first end fitting fixed to said conduit adjacent said first end and a second end fitting fixed to said conduit at said second end;
c. said first end fitting comprising first and second fitting members that are fixed together and permanently secure said drive coupling against axial movement relative to said casing to preclude removal of said drive shaft assembly from said casing, said first and second fitting members constructed for enabling relative rotation between said drive coupling and said first end fitting; and,
d. a lubricant disposed within said casing;
e. said casing and said drive shaft assembly sealed together for blocking leakage of lubricant from said casing as said casing and drive shaft assembly rotate and shift axially relative to each other
f. said drive coupling comprising a radially outwardly extending flange disposed between said first and second fitting members of said first end fitting, said first fitting member confronting a first axial face of said flange, said first end fitting further comprising a bearing disposed between said flange and said second fitting member, said bearing engaging a second axial flange face so that said flange is secured between said first fitting member and said bearing.

28. A flexible shaft drive transmission comprising:
a. a flexible drive shaft assembly having a first end connectable to a drive motor and a second end connectable to a driven implement, said drive shaft assembly comprising a flexible elongated drive transmitting member;
b. a tubular casing surrounding and coaxial with said drive shaft assembly, said casing supporting said drive shaft assembly for rotation generally about the longitudinal axis of said shaft assembly relative to said casing, said casing comprising a tubular flexible conduit loosely surrounding said drive transmitting member, a first end fitting fixed to said conduit adjacent said first drive shaft assembly end and a second end fitting fixed to said conduit at said second drive shaft assembly end;
c. a lubricant disposed within said casing; and,
d. a lubricant seal between one of said end fittings and the associated drive shaft assembly end, said seal comprising a smooth axially extending cylindrical sealing surface carried by one of said drive shaft assembly or said one end fitting and a sealing member carried on the other of said drive shaft assembly or said one end fitting, said sealing member projecting into sealing engagement with said sealing surface and maintaining a sealing relationship with said surface as said surface and sealing member rotate relative to each other and shift axially relative to each other.

* * * * *